United States Patent
Panhard

[15] 3,683,868
[45] Aug. 15, 1972

[54] ROTARY PISTON INTERNAL COMBUSTION ENGINES

[72] Inventor: Jean Panhard, Paris, France

[73] Assignee: Societe de Constructions Mechaniques, Panhard & Levassor, Paris, France

[22] Filed: March 18, 1970

[21] Appl. No.: 20,663

[30] Foreign Application Priority Data

March 18, 1969 France..................6907679

[52] U.S. Cl. ............123/8.13, 123/8.09, 123/8.32 S, 123/8.32 SP, 123/191 S
[51] Int. Cl.............................................F02b 53/00
[58] Field of Search..........123/8.09, 8.19, 8.35, 8.27, 123/8.45, 191 S, 148 C, 32 MS, 32 SP, 8.13, 8.11; 418/61

[56] References Cited

UNITED STATES PATENTS

| | | |
|---|---|---|
| 3,240,189 | 3/1966 | Stompfig...............123/8.13 |
| 3,297,005 | 1/1967 | Lamm...................123/8.13 |
| 3,053,238 | 9/1962 | Meuer...................123/8.13 |
| 3,463,126 | 8/1969 | Pax.......................418/61 X |
| 3,393,667 | 7/1968 | Jones....................123/8.09 |
| 3,508,530 | 4/1970 | Clawson...............123/191 S |
| 3,229,674 | 1/1966 | Muller...................123/8.09 |

*Primary Examiner*—C. J. Husar
*Attorney*—Waters, Roditi, Schwartz and Nissen

[57] ABSTRACT

There is arranged in the peripheral wall of the engine casing, a turbulence chamber which communicates through a large opening with the inside of the casing in a zone such that on the passage of a crest of the piston in this zone, there is substantial equality between the pressures of the chambers separated by the crest, the volume of each hollow on the perimeter of the piston being reduced by an amount substantially equal to the volume of the turbulence chamber for a given compression ratio. One or more spark plugs are arranged in the turbulence chamber.

7 Claims, No Drawings

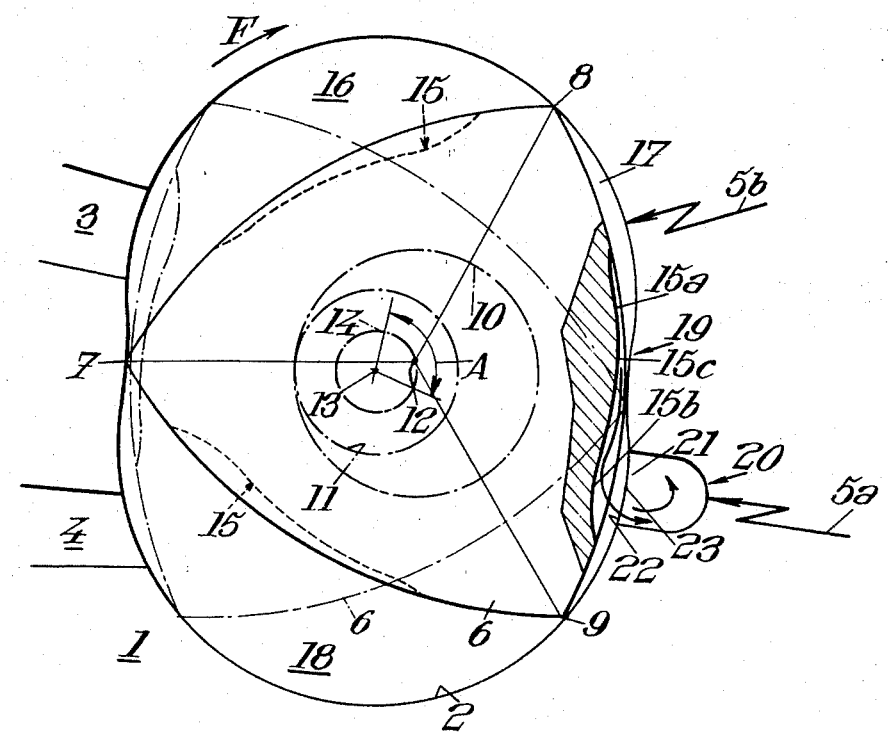

ROTARY PISTON INTERNAL COMBUSTION ENGINES

The present invention relates to rotary piston internal combustion engines and more particularly to those of the type which comprise, on one hand, a casing of which the inner peripheral wall bears at least one spark plug and has a trochoidal inner surface, and on the other hand, a rotary piston with several crests, which piston bears on its periphery hollows whose volume contributes to determining the compression ratio of the engine, and defines inside the said casing, by its crests in contact with the said inner surface, variable volume chambers.

The invention relates more particularly, because it is in this case that its application seems to offer the most advantage, but not exclusively, among these rotary piston engines, to those with trilobed pistons and/or for automobile vehicles.

It is an object of the invention, particularly, to render the said engines such that the combustion of the carburized mixture that they receive is more rapid and more complete therein.

To this end, the rotary piston engine of the type concerned is characterized, according to the invention, by the fact that there is arranged, in the peripheral wall of the casing, a turbulence chamber which communicates through a large opening with the inside of said casing, in a zone such that on the passage of a crest of the piston in this zone, there is substantially equality between the pressures of the chambers separated by this crest, by the fact that the volume of each hollow piston is reduced (with respect to an engine of the same geometry without turbulence chamber) by a value substantially equal to the volume of the turbulence chamber for a given compression ratio and by the fact that the one or more spark plugs is arranged in this turbulence chamber.

In order that the invention will be more fully understood, a preferred embodiment of a rotary piston engine according to the invention is described below purely by way of illustrative but non-limiting example, with reference to the accompanying drawing in which the single FIGURE shows, in diagrammatic section, one embodiment of a rotary piston engine according to the invention.

In order to construct such a rotary piston engine with improved combustion, the procedure is as follows.

First of all, as regards the engine as a whole, this is constituted by a casing 1 of which the peripheral wall has an inner surface 2, preferably cylindrical and of a cross-section in the form of a trochoid with two arcs. An intake opening 3 and an exhaust opening 4 are provided in the said casing to allow to pass respectively the fuel-combustion supporting mixture and the burnt gases. There is arranged at a suitable place, the peripheral wall of the casing, a spark plug 5a shown diagrammatically by a zigzag arrow. There is arranged, inside the casing, a rotary piston 6 substantially in the form of a right prism of which the profile has the form of a convex curvilinear equilateral triangle. The piston 6 includes three crests 7, 8 and 9 which, in the course of movement, remain constantly in contact with the surface 2. The whole is constructed in known manner and such that the piston 6 executes, with respect to the casing 1, a rolling movement of coplanar circles, one circle 10 being considered as fixed to the piston 6, and as a base, a second circle 11 inside the preceding one and considered as fixed to the casing 1. The center of the circle 10 is situated on an axis 12 passing through the center of gravity of the piston 6 and parallel to the generators of the piston. The center of the circle 11 is situated on an axis 12 passing through the center of symmetry of the surface 2 and parallel to the generators of this surface. The engine is provided with a shaft 14, co-axial with the axis 13 and means are provided to ensure the driving of the said shaft by the piston 6. There is arranged, on each of the curvilinear surfaces of the piston 6, elongated hollows 15 identical in lower width with that of the piston and of which the volume contributes to determining the compression rate or volumetric ratio of the engine. The piston 6, in contact with the surface 2 by its crests 7, 8 and 9, divides the inner volume of the casing 1 into three variable volume chambers 16, 17 and 18, limited respectively by the crests 7 and 8, the crests 8 and 9 and the crests 9 and 7.

The operation of such an engine is known and will be briefly recalled below.

When the piston 6 turns in the direction of an arrow F (clockwise direction in the figure), the chambers 16, 17 and 18 serve successively as intake chamber, compression chamber, combustion and expansion chamber and exhaust chamber. When the fuel-combustion supporting mixture reaches the desired compression ratio, which is always produced facing a same zone 19 of the surface 2, an ignition spark is produced and enflames the mixture which burns, expands and is evacuated.

It will be noted that the chamber 17, in the figure, is substantially at the end of the compression phase, that is to say that the piston 6 has substantially reached its top dead center point which corresponds to the minimal volume of the chamber 17. This chamber then offers a distinctly less volume than that of the chamber 16 but has a very elongated form which, at the moment when the ignition is produced, does not favour rapid propagation of combustion.

To increase the rapidity of combustion, according to the main feature of the invention, there is arranged in the peripheral wall of the casing 1 a turbulence chamber 20 which communicates through a large opening 21 with the inside of the said casing, in a zone 22 such that at the passage of a crest (crest 9 for example) of the piston 6 in this zone, there is substantial equality between the pressures of the chambers (17 and 18 in the example selected) separated by this crest, the volume of each hollow 15 of the piston 6 is reduced (with respect to an engine of the same geometry without turbulence chamber) by value substantially equal to the volume of the turbulence chamber 20 and the spark plug 5a is arranged in the said chamber 20. This latter is given the shape of a compact pocket, adapted to ensure turbulence of the gases and rapid propagation of the combustion in the fuel-combustion supporting mixture. The volume of this chamber, as may be deduced from the preceding description, is less than the volume of the hollow which exists in the piston of the said engine of the same geometry without turbulence chamber. The order of magnitude of the volume of the chamber 20 is of the order of 2 percent of the maximal volume of the chambers 16, 17 and 18, or 10 ml when the said maximal volume is 500 ml. The dimensions of the opening 21 are of the same order of magnitude as those of the exhaust opening 4, which enables a rapid transfer of gas to be ensured between the turbulence chamber 20 and the chambers 16, 17 or 18. Obviously, the opening 21 does not extend over the whole length of a generator of the cylindrical surface 2, in order to enable continuous guidance of the crests 7,8,9 constituted generally by segments which can be radially displaced with respect to the piston 6 and which extend over the whole length of a generator of the latter.

The selection of the position of the chamber 20 is important since, on the passage of one of the crests 7, 8 or 9 to this position, communication is established between two of the three chambers 16,17,18, that is to say between the two chambers which are then situated on both sides of the crest concerned. A transfer of gas between the chambers 17 and 18, for example, may be troublesome to the good operation of the engine, especially if fresh gases escape, without burning, from the chamber 17 to the opening 4 through the chamber 18, which makes the yield of the engine drop. It is why the zone 22 where the chamber 20 opens, has been selected in such a way that a generator 23 called "equilibrium," as stated above, of which the definition will now be specified, is included in the said zone. The equilibrium generator 23 of the surface 2 is such that on the passage of a crest of the piston 6 over this generator, there is equality between the pressures of the chambers situated on both sides of the crest, that is to say in the case of the crest 9, equality between the pressure of the chamber 17 in the course of compression and the pressure of the chamber 18 in the course of expansion. In the same way, at the moment when the turbulence chamber 20 establishes communication between the two chambers 17 and 18, the transfer of gas between these chambers is minimal.

The generator 23 is situated in a quadrant of which the summit is situated on the axis 13 and which is opposite to that including the intake opening 3. It suffices, also, that the opening 21 straddles the generator 23 at the moment of equality of the pressures, without being however strictly symmetrical with respect to said generator.

If the opening is of substantially rectangular shape or substantially elliptical, for example, its axes may have an inclination to the generatrix of the cylindrical surface 2, and for simplification, it will then be said that this opening 21 is inclined to the generators of the wall.

The turbulence chamber 20 may be produced directly on casting, in the case where the casing is produced of cast metal, and undergo a finishing by machining, or be entirely reduced by machining, the casing being then produced of cast metal or of forged metal. For example, a convenient method of machining to produce this chamber consists of forming in the wall of the casing, on part of the inner surface and substantially in the middle of the equilibrium generator 23 (this generator being considered as bounded by the transverse surfaces of the casing), two cylindrical blind holes, of suitable diameter and length for the obtaining of the volume to be given to the turbulence chamber and whose respective axes separate obliquely, and in substantially symmetrical manner, on both sides of the axis of the plug housing, in a plane containing the said axis of the plug housing and the equilibrium generator 23.

The hollows 15 have a more or less elongated shape and their bottom shows a surface such that, if traversed in the direction of the arrow F, there occurs a zone 15a which can be flat, convex or concave with slight curvature and which is tangentially connected, either by itself or through a zone 15c which can be flat, concave or convex, to a concave terminal zone 15b whose curvature is determined so as to favour turbulence in the chamber 20. In the figure, for example, there is seen a shape of hollow of which the bottom is composed of a concave surface zone with slight curvature 15a, connected to a concave surface zone of greater curvature 15b, by an intermediate zone of convex surface 15c.

In addition, combustion may be improved again by arranging, in a manner known in itself, at least one other spark plug 5b in the "rear" part of the combustion chamber, as part be defined below, this plug being shown diagrammatically as the first in the FIGURE.

Cooling means (not shown) are provided for the chamber 20 which receives considerable heat flows. This being the case, the operation of such an engine is as follows.

There will be considered for example the evolution of the chamber 17 on rotation of the piston 6 in the direction of the arrow F.

In the position which is shown for chamber 16 in the figure, the chamber 17, in communication with the intake opening 3, increases in volume and serves as intake chamber.

When the crest 8 has passed by the opening 3, the chamber 17 is isolated and its volume diminishes. The chamber 17 has become the compression chamber. The pressure of the gases of the chamber 17 increases while the crest 9 passes by the plug 5b and approaches the turbulence chamber 20.

When the crest 9 arrives at the right of the opening 21 of the chamber 20, communication is established between the chamber 17 in the course of compression and the chamber 18 in the course of expansion. But, given the choice of the position of the opening 21, the pressures in the chambers 17 and 18, and hence in the chamber 20, are substantially equal and the transfer between fresh gas of chamber 17 and burnt gases of chamber 18 is minimized. When the crest 9 has passed by the opening 21 (position shown in the figure), the chamber 17 is again isolated and, as can be seen in the figure, part 15b of the corresponding hollow 15 of the piston 6 arrives facing the chamber 20. The chamber 17 is divided substantially into two parts:

a front part (direction of the arrow F) bounded by the crest 9, whose volume increases, in which part is to be found the opening 21;

a rear part, bounded by the crest 8 which has not yet reached the plug 5b, of which part the volume diminishes.

Hence, in the midst of chamber 17 which is then isolated, a flow of gas occurs from the rear part towards the front part and a turbulent movement, facilitated by the zone 15b of the hollow 15, is created in the chamber 20.

The ignition of the comburant-fuel mixture takes place when combustion chamber 17, in communication with the turbulence chamber 20, is isolated from the chamber 18. The ignition point, variable as a function of the speed, runs in an angular range A of the positions of the axis 12 between about 80° before the top dead center point to 20° after the top dead center point. In the figure, the position of the top dead center point corresponds to the passage of the axis 12 into the plane of symmetry of the surface 2 passing between the openings 3 and 4. The ignition of the gases of the front part of the chamber 17 by the plug 5a is followed by rapid combustion by reason of the concentrated volume of the turbulence chamber 20 which contains the major part of the mixture. The gases from the rear part of the chamber 17, of more elongated shape, are ignited at practically the same time, especially if there is also a plug 5b.

The expansion then occurs in the chamber 17 which increases in volume and comes in communication with the exhaust when the crest 9 has passed by the opening 4.

As a result of which there is obtained a rotary piston engine which responds well to the object which it was proposed to achieve and which has the following advantages.

Firstly, by reason of the turbulence created by the chamber 20 and the hollows 15 of the piston and by reason of the concentrated shape of the said chamber, combustion is more rapid and more complete. The ratio of unburnt gases decreases, the temperature of the exhaust decreases, since combustion is not prolonged in the expansion chamber (18, for example in the case of the figure), and the thermal yield of the engine increases.

Secondly, by reason of the reduction in volume of the hollows 15, at substantially constant volumetric ratio, on one hand, there is obtained more complete evacuation of the burnt gases through the exhaust port 4 since the minimum volume of the chambers 16,17,18 has diminished and, on the other hand, the section of the passage between the exhaust port 4 and intake port 3 is reduced when the piston 6 occupies the position shown in mixed line in the figure. The passage of burnt gases into the intake chamber is thus reduced whereby better filling with fresh gas is ensured.

As is self-evident, and as results besides already from the preceding, the invention is in no way limited to that of its methods of application, nor to those of its methods of production of its various parts, which have been more particularly described; it embraces on the contrary all variations.

What I claim is:

1. Rotary piston internal combustion engine comprising, a casing whose inner peripheral wall is adapted to bear at least one spark plug and has a trochoidal inner surface and a rotary piston with a plurality of crests, the surface of said piston defining hollows on its perimeter, the volume of said hollows contributing to determining the compression ratio of the engine, and said piston defining inside said casing, by its crests in contact with said inner surface, combustion chambers of variable volume, said peripheral wall of the casing defining also a turbulence chamber in the form of a pocket in said wall, said pocket communicating through a large unobstructed opening so-positioned in a zone of said inner surface with said combustion chambers that on the passage of a crest of the piston in said zone, there is substantial equality between the pressures of the chambers separated by the latter said crest, the volume of each hollow of the piston being reduced (with respect to an engine of the same geometry without turbulence chamber) by a value substantially equal to the volume of the turbulence chamber for a given compression ratio and means for arranging said spark plug in said turbulence chamber, said spark plug being timed to fire when the piston is in such a position that said turbulence chamber is in communication with a said combustion chamber under compression and is isolated from the preceding combustion chamber, whereby through cooperation of the timing of said spark plug with the passage of said hollows past the turbulence chamber more rapid and complete combustion of the fuel mixture in the turbulence chamber and combustion chamber under compression is obtained.

2. Rotary piston engine according to claim 1, wherein said rotary piston has three crests.

3. Rotary piston engine according to claim 1, wherein the volume of the turbulence chamber is of the order of 2 percent of the maximal volume of the said variable volume chambers.

4. Rotary piston engine according to claim 1, wherein the turbulence chamber communicates with the inside of the casing through an opening whose dimensions are of the same order as those of the exhaust opening.

5. Rotary piston engine according to claim 1, wherein the turbulence chamber has at least one axis included to the generatrix of said trochoidal inner surface.

6. Rotary piston engine according to claim 1, wherein the point of ignition is located in an angular zone of about 100° and, relative to an engine shaft driven by the rotary piston, said zone extending from about 80° before the top dead center point of said shaft to about 20° after said point.

7. Rotary piston engine according to claim 1, wherein said hollows have a surface comprising a concave surface of slight curvature connected by an intermediate zone to a concave surface of greater curvature.

* * * * *